J. Reichmann.

Steam Engine Valve.

No. 3,263. Reissued Jan. 12, 1869.

Fig: 2.'

Witnesses.
J. B. Turchn
Jas R Hayden

Inventor
Joseph Reichmann

Sheet 2 - 2 Sheets.

J. Reichmann.

Steam Engine Valve.

No. 3,263 Reissued Jan. 12, 1869.

Witnesses.
J. B. Turchin
Jas R Hayden

Inventor
Joseph Reichmann

United States Patent Office.

JOSEPH REICHMANN, OF DUBUQUE, IOWA.

*Letters Patent No.* 74,593, *dated February* 18, 1868; *reissue No.* 3,263, *dated January* 12, 1869.

IMPROVEMENT IN VALVES FOR STEAM-ENGINES.

The Schedule referred to in these Letters Patent and making part of the same.

*To all whom it may concern:*

Be it known that I, JOSEPH REICHMANN, of Dubuque, in the county of Dubuque, and State of Iowa, have invented a new and useful Improvement in Valves for Steam-Engines; and I do hereby declare that the following is a full, clear, and exact description thereof, which will enable others skilled in the art to make and use the same, reference being had to the accompanying drawings, forming part of this specification, in which—

Figure 1:
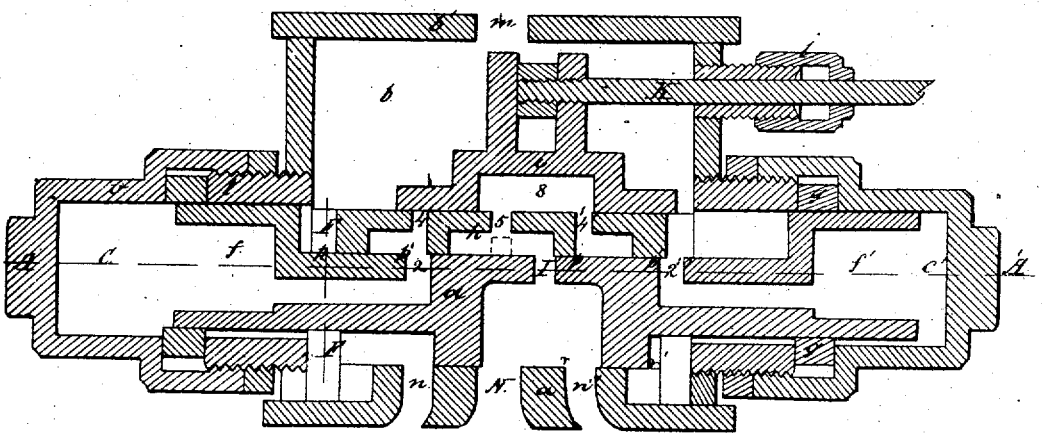
Figure 1 is a longitudinal section of the apparatus, taken along the line B B', figs. 3, 4, and 7.
Figure 1:
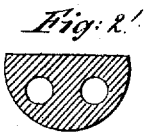
Figure 2:
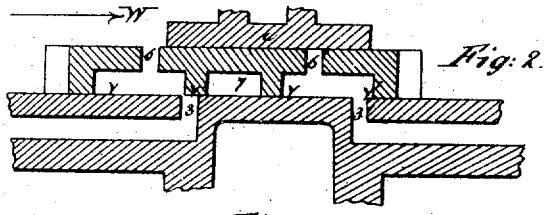
Figure 2 is a longitudinal section of the same, taken along C C', figs. 3, 4, and 7.
Figure 3:
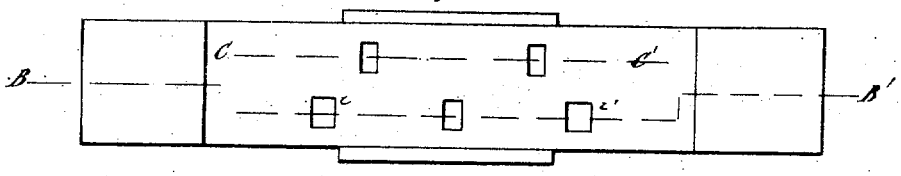
Figure 4:
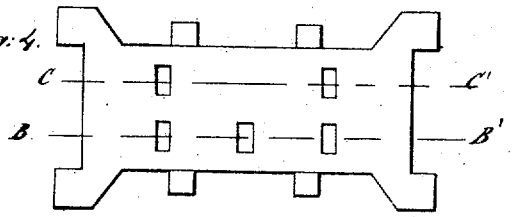
Figure 5:
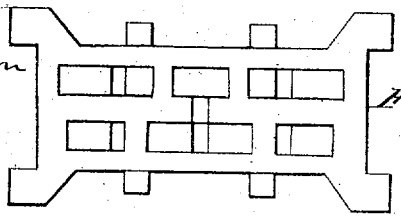

Figure 2' is a section of the valve-piston *f*, along the line F F, fig. 1;

Figure 3 is a plan of the main valve;

Figure 4 is a plan of the stationary port and valve-plate;

Figure 5 is a plan of the bottom of the same.

Figure 6:
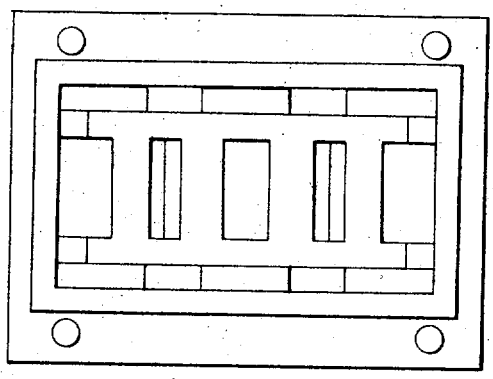
Figure 7:
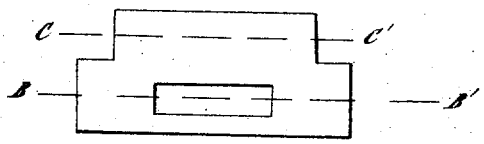

Figure 6 is a plan of the cylinder-face, and a horizontal section of steam-chest;

Figure 7 is a plan of the bottom of the small valve and

Figure 8:
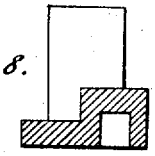

Figure 8 is a cross-section of the same.

Similar letters of reference indicate like parts.

The nature of my invention consists—

First, in the arrangement by which steam being admitted on one side of the valve-piston, and the exhaust produced on the other, moves said valve-piston and the valve.

Second, in the arrangement by which, when the valve-piston and the valve reach the required point, steam is admitted to the opposite side of said valve-piston, to act against the same, and thereby checks the motion of said piston and of the valve, and, at a desired point, stops them.

To enable others skilled in the art to make and use my invention, I will proceed to describe its construction and operation.

Plate *a* is a valve-face of a steam-engine cylinder, of ordinary three-ports construction, in which N is the main exhaust-port, and *n n'* are the steam-ports.

*b* is the steam-chest.

*b'*, the cover, with a steam-opening, *m*.

*d* is the main valve, arranged as shown in the drawing, and forming, with the piston *f f'*, one and the same piece, or they may be arranged separately. It is provided with three exhaust-ports, 1, 2, and 2', fig. 1, and two steam-ports, 3 and 3', fig. 2, and is bearing on the valve-face steam-tight, having sufficient room to travel the required distance.

Bushings *t* and couplings *v* form the cylinders for piston *f* and *f'*; *j* being the packing-rings for said piston, and is held between the bushing and the coupling.

*h* is a port and valve-plate, resting on the main valve and bearing steam-tight, and is held in its position by the steam-chest *b*. It is provided with three exhaust-ports, 4, 4', and 5, fig. 1, and two steam-ports, 6 and 6', and a safety-cup, 7, fig. 2.

*i* is the small valve, provided with an exhaust-cup, 8, fig. 1, and is moved by the rod K, passing through the stuffing-box *l*.

Figures 9 and 10 will serve to illustrate one method of operating the valves, the first being a vertical section on the line *b' b'* of fig. 10, and the latter being an elevation of the devices used.

A rocker-arm, *a*, shaped as a quadrant, and provided with pins and slots, *b b*, is fitted at one end to pin *c*, so as to turn freely around it, and is connected, at the other end, with the valve-rod K (see the application) by pin *d*.

Rocker-arm *e* is also fitted to pin *c*, and turns freely on it at one end, and is connected by means of pin *g* of block *h* to the collar *i'*, provided with the slot K' of the piston-rod *l* (see application) at the other end, pin *c* being held in position by the bracket *f*, bolted to the engine-frame.

When the piston-rod *l* moves in the direction W, thereby moving arm *c*, and also pin *b* of the quadrant *a*, the valve-rod K moves in an opposite direction, *m*, and takes a position, marked by red lines, at the end of the stroke of the main piston of the engine.

This rod K thus will move valve 7 of my device, which will close steam-port 4', and open steam-port 6', and exhaust-port 4, handle *a''* being for the purpose of working the valve *i* by hand, when the valve is used for trip-hammers and other devices.

The operation of of my valve consists in the following:

In the position as it is represented in the drawing, steam being admitted through opening *m*, into the steam-chest *b*, enters port 2', fig. 1, and fills chamber *c'* of the valve-cylinder; it also enters port 3, fig. 2, thereby filling chamber *c* of the valve-cylinder, in consequence of which the main valve *d* will remain in position, as represented in the drawing.

The steam at the same time enters, through steam-port *u*, into the main cylinder of the engine, and moves the main piston in the direction W, as marked by the arrow, which, by reaching the proper point, will move rod K and the small valve *i*.

This closes steam-port 6 and exhaust-port 4', and opens steam-port 6' into 3', opening also exhaust-port 2, in consequence of which, steam will go out of the chamber *c* of the valve-cylinder, through 4 into 5, and from where it may also be carried off by an exhaust-pipe from valve-plate *h*, and from 5 into 1, and into the main exhaust-port N; while the steam that enters 6' into 3', and into the chamber *c'*, will move the valve-piston *f'* in the direction from A' to A, and the point *r'* of said piston *f'* will move to the point *r*, thus opening steam-port *n'*, in putting steam-port *n* into communication with exhaust-port N, in consequence of which, a return motion of the main piston of the engine will commence; but, while the point $r'$ of the main valve comes to the point $r$, the points $p'$ $p'$ of the same valve come to the points $p$ $p$, fig. 1, the port 2 becomes covered by valve-plate $h$, before the point $p'$ reaches point $p$, thereby cutting off the exhaust communication of chamber $c$, and by reaching point $p$, will again be uncovered, and the points $v'$ $v'$ come to the points $v$ $v$, fig. 2, whereby port 4′ of the plate $h$, and port 2′ of the valve, will come into communication, and the port 2 will become uncovered by the plate $h$, and the steam will enter into port 2, and through it into the chamber $c$ of the valve-cylinder, thereby checking the motion of the main valve, stopping at the point $r$.

When the main piston of the engine reaches a certain proper point, at which rod K begins to move valve $i$, then the steam-port 6′ and exhaust-port 4 will be shut, and steam-port 6 and exhaust-port 4′ will become open, and the operation will be repeated, and the valve will move from A to A′, taking the position as represented in the drawing.

The cup $f$, as represented in figs. 2 and 5, having communication with exhaust-port of plate $h$, is intended to act as a safety-port. For instance, in the above-described operation, if steam, being admitted through port 2′, should fail to check the motion of the main valve, in case of its too rapid movement, the continuation of its motion would open communication between ports 3 and 7, thereby reducing pressure in the chamber $c$, increasing the steam-opening 2′, and not only would check the motion of the main valve, but would force it back to the position shown in the drawing.

I will remark here, that the whole combination is so arranged, that the main valve $d$ may travel sufficient distance over the ports to give to the steam, acting against the piston, sufficient time to check its own motion, without interfering with or reducing the steam-passages; also, that the motion in regard to speed of the valve-piston, may be regulated by the size of the exhaust-port 1, and that the small valve $i$ may be operated by the engine itself, or by hand.

Having thus described my invention,

I claim as new, and desire to secure by Letters Patent—

1. The steam and exhaust-ports as arranged, whereby to cause motion of the valve-piston, and to check and stop the motion of said piston, substantially as herein set forth.

2. The stationary valve-plate $h$, constructed as described.

3. The combination of the valve $d$, piston $f$, cylinder $c$, plate $h$, and valve $i$, constructed and arranged as described, whereby to induce acting and checking-motion, substantially as and in the manner herein set forth.

4. The valve $i$ as arranged, whereby to supply steam to the cylinders C and C′, when partially filled with steam, and at the same time to produce exhaust upon the side opposite to that being supplied, as set forth.

5. The valve-plate $h$, constructed and arranged with reference to the ports 2 and 2′, whereby to close the exhaust in their outward movement, and to uncover them to the live steam at their outermost position, substantially as set forth.

JOSEPH REICHMANN.

Witnesses:

ALFRED WEISBERG,
J. G. MENKEL.